March 19, 1963 W. H. KESTER 3,081,833
SPREADER BEAM AND WEIGH SCALE FOR TEEMING LADLES
Filed Oct. 12, 1961 2 Sheets-Sheet 1
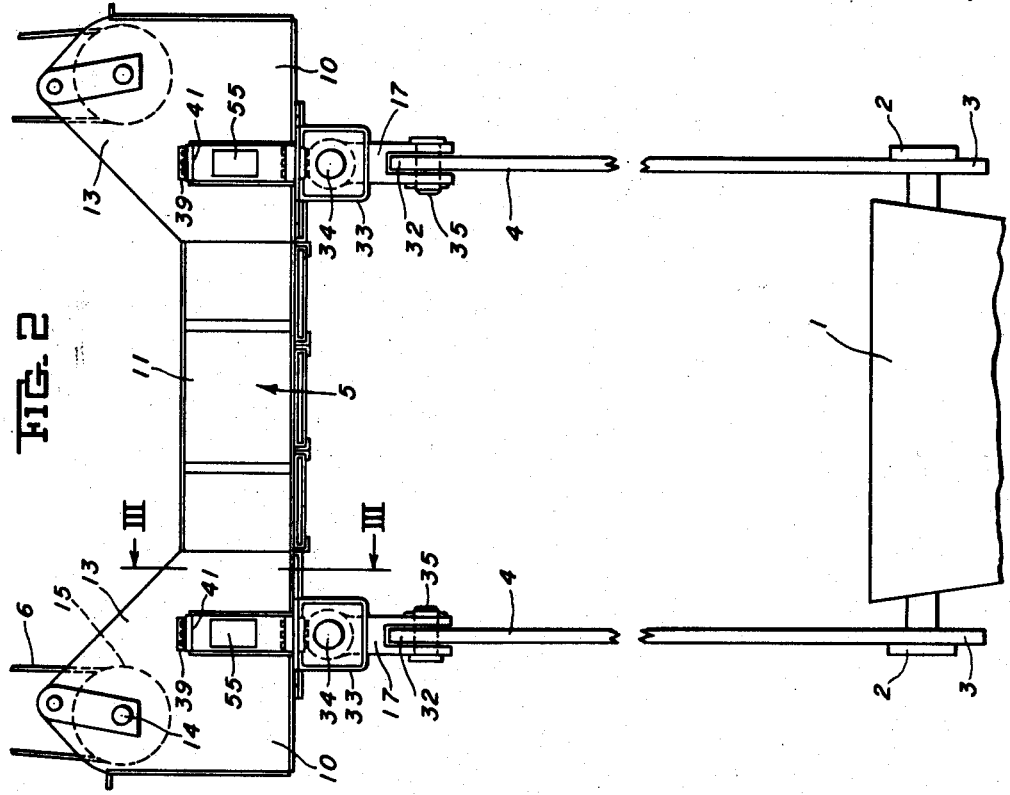
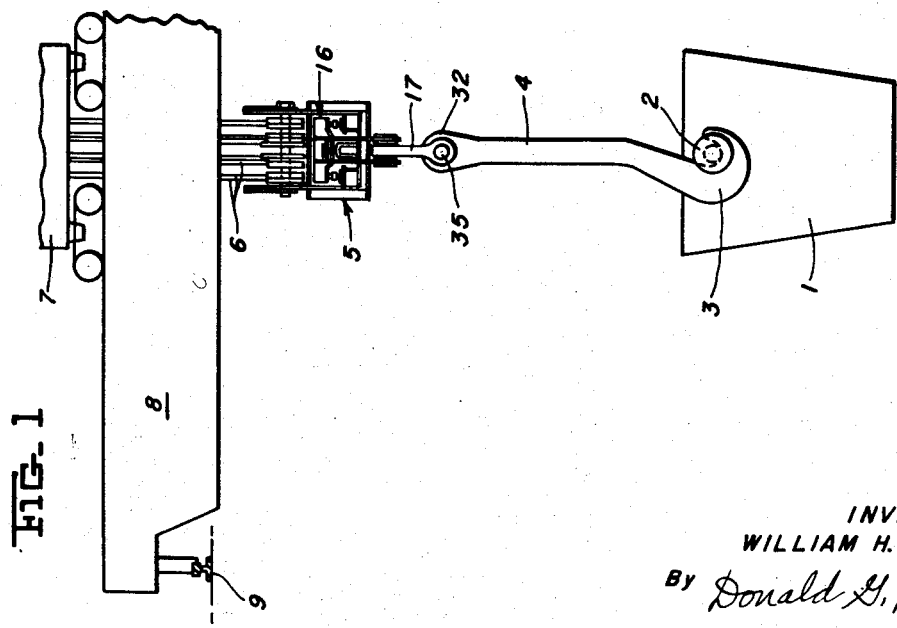
INVENTOR
WILLIAM H. KESTER
By Donald G. Dalton
Attorney

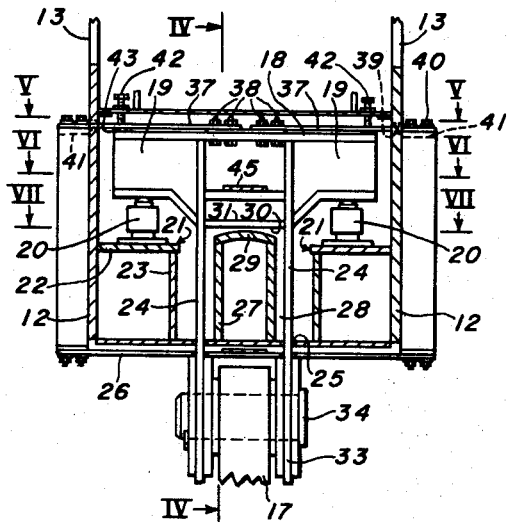
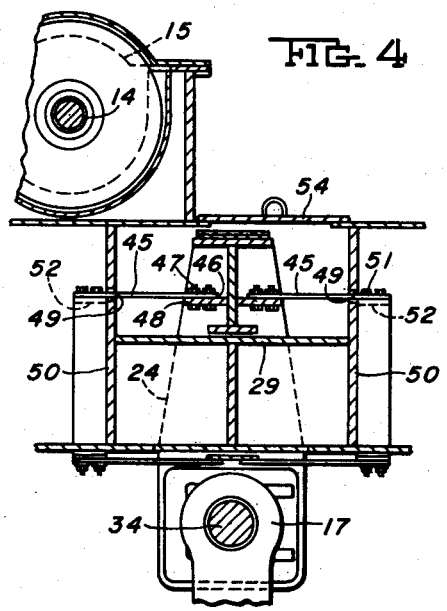
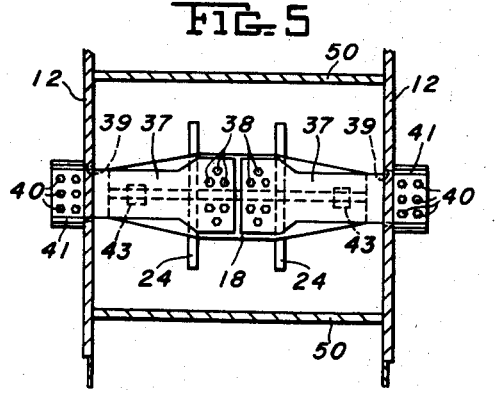
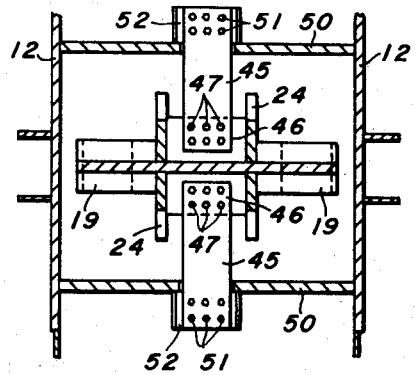
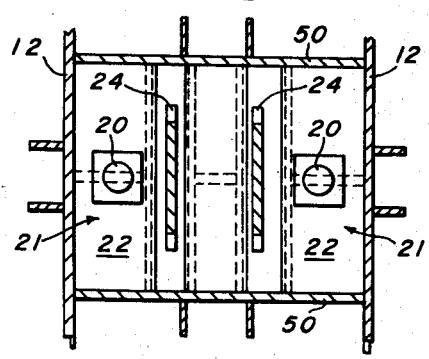
INVENTOR
WILLIAM H. KESTER

United States Patent Office 3,081,833
Patented Mar. 19, 1963

3,081,833
SPREADER BEAM AND WEIGH SCALE FOR
TEEMING LADLES
William H. Kester, Sewickley, Pa., assignor to United
States Steel Corporation, a corporation of New Jersey
Filed Oct. 12, 1961, Ser. No. 144,606
12 Claims. (Cl. 177—147)

This invention relates to a spreader beam for suspending ingot-teeming ladles from a travelling crane and is directed, more particularly, to improvements that form part of an apparatus in the nature of an electrical scale for weighing molten metal in a teeming ladle while it is suspended from the spreader beam.

Accurate control of the weight of steel ingots cast by teeming metal into a mold is desirable from the standpoint of reducing scrap losses during subsequent rolling operations, but cannot be obtained by conventional pouring practices in which the weight of the ingot being cast is under the manual control of the pouring operator. According to such practices, the operator attempts to fill the ingot mold to a predetermined level, but poor visibility, by reason of the incandescence of the metal and the flame and smoke produced during teeming, makes visual determination of the level of the metal in the mold very difficult, and the weights of the resulting ingots will thus vary widely with the skill of the operator. In addition, other factors, such as metal shrinkage, the extent of degassing, and variation in the volume of successive molds, further contribute to the production of ingots having weights that vary over wide limits.

To eliminate the disadvantages of manual control of the teeming operation in conventional practices, apparatus that furnishes a continuous indication of the weight of the molten metal in a teeming ladle has been proposed, so that the ladle stopper rod can be operated to interrupt the teeming operation after the required weight of metal has been teemed therefrom into the mold. More specifically, the use of electrical strain gauges or compression cells of conventional construction in the support or ladle suspension system by which the teeming ladle is suspended from the mill crane has been proposed for this purpose. However, the accuracy of weighing systems of this character has been found to be seriously impaired by low frequency and high amplitude vibrations caused by pendulum and mass-spring oscillations in the ladle suspension system.

One of the principal objects of this invention is to provide, in teeming ladle suspension systems of the type in which electrical strain gauges are subject to the mass of the teeming ladle and its contents, improvements for eliminating the variations in weight indications that have been caused by pendulum and mass-spring oscillations in previous proposals of this character.

A further object is to provide an improved spreader beam and strain gauge suspension system for supporting a pair of teeming ladle hanger hooks from the hoist cables of a travelling crane. Another object is to provide a system of this character in which the load to be weighed is supported by separate pairs of electrical compression cells at opposite ends of the spreader beam which are symmetrically arranged with respect to the spreader beam longitudinal center-line. A related object is to provide a pair of identical yoke assemblies in a spreader beam of this character that respectively include a cross-beam that extends transversely of the spreader beam and has its ends supported on one of the said pairs of compression cells, and in which the ladle hanger hooks are suspended from the center portions of the yoke assembly cross-beams so that the compression cells are cumulatively subject to the weight of the metal in the teeming ladle carried by the hanger hooks.

Other objects and advantages of the invention will become apparent from the following description and accompanying drawings, in which:

FIGURE 1 is a fragmentary view diagrammatically showing the manner in which the spreader beam of this invention is used to support a transfer ladle on a travelling crane;

FIGURE 2 is an enlarged side elevational view of the spreader beam shown in FIGURE 1;

FIGURE 3 is an enlarged sectional view taken substantially along the line III—III of FIGURE 2; and FIGURES 4–7 are sectional views taken respectively along the lines IV—IV to VII—VII of FIGURE 3.

The drawings illustrate somewhat diagrammatically the conventional manner in which a transfer ladle 1 for molten metal is supported by side trunnions 2 on hooks 3 at the lower ends of a pair of ladle hangers 4. As indicated above, the ladle 1 is preferably a teeming ladle and accordingly has the usual stopper rod mechanism (not shown) for controlling the flow of metal therefrom into ingot molds. The ladle hangers 4 are suspended from a spreader beam 5 that in turn is suspended by hoist cables 6 from a trolley carriage 7 that is mounted for movement over the main crane girders 8 of a travelling crane, the girders 8 being supported at opposite ends thereof in the usual manner for movement over crane rails 9. As indicated above, this invention resides in the spreader beam 5 and the support for the ladle hangers 4 thereon that forms part of an electrical scale for indicating the weight of the molten metal in the ladle 1.

The spreader beam is fabricated by welding metal plates in the form of a hollow box-like structure comprised of identical end portions 10 that are held in spaced relation by a center portion 11. The side plates 12 of each end portion 10 have vertical extensions 13 that project upwardly and furnish a support for opposite ends of a shaft 14 that carries the pulley wheels 15 over which the trolley crane hoist cables 6 are reeved.

The ladle hangers 4 are supported on the opposite end portions 10 of the spreader beam 5 by identical yoke assemblies 16 and suspending links 17. Each of the yoke assemblies 16, with reference to FIGURE 3, comprises a horizontal cross-beam 18 that extends transversely with respect to the longitudinal center-line of the spreader beam 5 and has its opposite ends 19 supported by the upper ends of a pair of electrical compression cells 20. The lower ends of the compression cells 20 are supported on the spreader beam 5 by a pair of box-like supporting stools 21 that are mounted in laterally spaced relation and are comprised respectively of a horizontal plate 22 and a vertical plate 23 which have welded connections to each other and with the spreader beam 5. The compression cells 20 supporting each cross-beam 18 are spaced equal distances from the longitudinal center-line of the spreader beam 5 and are thus symmetrically located on the spreader beam at the corners thereof. Since the cells 20 are located between the ends of the beams 18 and the spreader beam 5, they are cumulatively subject to the weight of the load supported on the spreader beam 5 by the assemblies 16.

Each cross-beam 18 includes a pair of laterally spaced plates 24 that are located equal distances from the longitudinal center-line of the cross beam 5 and depend vertically downwardly through openings 25 in the bottom 26 thereof. A stool 27 mounted on the spreader beam bottom 26 in the space 28 between the openings 25 has a top member 29 for supporting engagement with the lower surface 30 of a horizontal supporting plate 31 at the center of the cross-beam 18. The member 29 and surface 30 are normally spaced vertically apart and out of supporting engagement with each other when the end portions 19 of the cross-beams 18 are supported by the compression cells 20, but if the cells 20 fail or are removed the surface 30 will move into supporting engagement with the member 29 to support the assemblies 16 on the cross-beams 18.

The suspending links 17 form a supporting connection between the upper ends 32 of the ladle hangers 4 and the lower ends 33 of the supporting plates 24. At its upper end each link 17 is suspended by a pivot pin 34 that extends through aligned openings in the lower ends 33 of the plates 24 and the upper end of the link 17. The lower ends of the links 17 are bifurcated and connected by pivot pins 35 with the upper ends 32 of the ladle hangers 4. The pivot pins 35 provide for swinging movement of the ladle hangers 4 about a common axis that is positioned below and parallel to the spreader beam 5, while the pivot pins 34 provide for swinging movement of the ladle hangers 4 about parallel axes extending transversely of the spreader beam 5 at opposite ends thereof.

Each of the cross-beams 18 is held against horizontal movement in a direction transversely of the longitudinal center-line of the spreader beam 5 by a pair of flat leaf springs 37. The adjacent ends of the springs 37 are secured to the cross-beam 18 by bolts 38 and their outer ends extend through openings 39 in the side plates 12 and are secured by bolts 40 to cross-bars 41 that are welded to the outer surfaces of the side plates 12. While the springs 37 operate to hold the cross-beams 18 against endwise movement, they do not interfere with their vertical movement under changing loads and flex about their bolted connections to permit such vertical movement. Set screws 42 bearing against the upper surfaces of the springs 37 operate to hold the ends 19 of the cross-beam 18 in engagement with the upper ends of the load cells 20, filler straps 43 being inserted for this purpose between the springs 37 and the beam ends 19 opposite the points at which the inner ends of the screws 42 engage the spring 37.

In a similar manner, each cross-beam 18 is held against horizontal movement in a direction extending along the longitudinal center-line of the spreader beam 5 by a pair of flat leaf springs 45. As best shown in FIGURE 4, the adjacent inner ends 46 of springs 45 are connected by bolts 47 to horizontal plates 48 that form part of the structure of the beam 18. The outer ends of the springs 45 extend through openings 49 in partition plates 50 that extend transversely of and form part of the structure of the spreader beam 5. Such outer ends of the leaf springs 45 are connected by bolts 51 to bars 52 that are welded to the outer surfaces of the plates 50. The springs 45 flex to permit vertical movement of the cross-beams 18 while operating to prevent horizontal movement thereof.

Access to the cross-beams 18 for repair or removal and replacement of the assemblies 16 is provided by openings to the interior of the spreader beam 5 that are covered by a top closure plate 54 and side closure plates 55.

The specific construction of the compression cells 20 has not been shown in the drawings since they are conventional electrical strain gauge units that may be obtained on the market from a number of different suppliers. The cells 20 are of the type commonly designated by the term "SR-4 load cells" that are constructed, for example, as shown in Bulletin 4301 of the Baldwin-Lima-Hamilton Corporation, Philadelphia, Pa. When connected in a bridge circuit as shown on pages 4 and 5 of this publication, the cells 20 being cumulatively subject to the weight of the molten metal in the ladle 1 will furnish an indication of the load to which they are subject. By reason of their symmetrical arrangement at the four corners of the spreader beam 5, and their connection in a bridge circuit, the cells 20 in operation balance out pendulum and spring-mass induced oscillations that in previous proposals of this character have caused variations in the indicated weight of the molten metal.

In operation, the spreader beam 5 is assembled with the ladle hanger hooks 4 supported thereon by the load cells 20 through the links 17 and the cross-beams 18, and is suspended from the trolley carriage of the mill crane. The spreader beam 5 is then maneuvered by the crane operator to cause the hooks 4 to pick up and transfer a ladle 1 to a pouring position in the usual manner. After the ladle 1 is supported on the spreader beam 5, the load cells 20 operate to furnish an indication of the weight of the metal in the ladle 1. During teeming of metal from the ladle into an ingot mold, the indicated weight of the metal in the ladle decreases, and the teeming operation is discontinued when the operator observes that the desired quantity of metal has been transferred to the ingot mold.

While one embodiment of my invention has been shown and described it will be apparent that other adaptations and modifications may be made without departing from the scope of the following claims.

I claim:

1. In apparatus for weighing molten metal in a ladle suspended from a travelling crane by a pair of ladle hangers and a spreader beam, the combination comprising a pair of parallel cross-beams respectively arranged adjacent opposite ends of said spreader beam in positions extending transversely thereof, each of said cross-beams having a supporting connection at a point centrally located between its ends with the upper end of one of said ladle hangers, and means comprising separate pairs of electrical compression cells supporting said cross beams on said spreader beam, said electrical compression cells being respectively arranged between the said ends of said cross-beams and said spreader beam in positions cumulatively subject to the weight of the metal in said ladle.

2. In apparatus for weighing molten metal in a ladle suspended from a travelling crane by a pair of ladle hangers and a spreader beam, the combination comprising separate pairs of electrical compression cells mounted on opposite ends of said spreader beam in positions spaced laterally equal distances from the longitudinal center-line thereof, a pair of cross-beams spanning the space between each of said pairs of compression cells and having end portions supported thereon, and means connecting said ladle hangers to said cross-beams at points centrally between the said compression cells in the one of said pairs on which they are respectively supported whereby said compression cells are cumulatively subject to the weight of the metal in said ladle.

3. An apparatus as defined in claim 2 including means holding each of said cross-beams against upward vertical movement relative to said spreader beam and the compression cells on which they are supported.

4. Apparatus as defined in claim 3 in which said holding means comprises separate pairs of adjustable set screws respectively supported on said spreader beam for holding opposite ends of said cross-beams against upward movement.

5. An apparatus as defined in claim 2 including means holding said cross-beams against horizontal movement relative to said spreader beam and providing for their vertical movement relative to said spreader beam in response to changes in the load applied by said cross-beams to said compression cells.

6. Apparatus as defined in claim 5 in which said holding means comprises a plurality of flat leaf springs disposed in horizontal positions and having connections at their opposite ends with said cross-beams and said spreader beam.

7. In apparatus for weighing molten metal in a ladle suspended from a traveling crane by a pair of ladle hangers and a spreader beam, the combination comprising a pair of parallel cross-beams respectively arranged adjacent opposite ends of said spreader beam in positions extending transversely thereof, means suspending said ladle hangers and thereby said ladle on said cross-beams comprising a pair of vertically extending links respectively having pivotal connections at their lower ends with the upper ends of said ladle hangers and pivotal connections at their upper ends with said cross-beams at points adjacent the centers thereof, said lower pivotal connections providing for swinging movement of said ladle hangers about a common horizontal axis parallel to said spreader beam and said upper pivotal connections providing for swinging movement of said ladle hangers about axes extending transversely of opposite ends of said spreader beam, and means for electrically determining the weight of the metal in said ladle comprising electrical compression cells supporting opposite ends of said cross-beams on said spreader beam and being cumulatively subject to the weight of the metal in said ladle.

8. Apparatus as defined in claim 7 including a pair of horizontal leaf springs respectively extending outwardly in opposite directions from opposite ends of each of said cross-beams and having connections at their opposite ends respectively with said cross-beam ends and with said spreader beam, said springs operating to hold said cross-beams against horizontal movement relative to said spreader beam and providing for their vertical movement relative to said spreader beam in response to changes in the load applied by said cross-beams to said compression cells.

9. Apparatus as defined in claim 7 including safety means for supporting each of said cross-beams on said spreader beam independently of said compression cells.

10. Apparatus as defined in claim 9 including said safety means comprising stools carried by said spreader beam and positioned under said cross-beams, said stools being normally out of engagement with said cross-beams when supported on said spreader beam by said compression cells and being adapted to engage and support said cross-beams upon failure and removal of said compression cells.

11. In apparatus for weighing molten metal in a ladle suspended from a travelling crane by a pair of ladle hangers and a spreader beam, the combination comprising a pair of parallel cross-beams respectively arranged adjacent opposite ends of said spreader beam in positions extending transversely thereof, each of said cross-beams including a pair of hanger elements in depending positions on opposite sides of and spaced equal distances from the longitudinal center-line of said spreader beam, means connecting the upper ends of said ladle hangers with the lower ends of said depending hanger elements to suspend said ladle on said cross-beam, and means for electrically determining the weight of the metal in said ladle comprising electrical compression cells supporting opposite ends of said cross-beams on said spreader beam and being cumulatively subject to the weight of the metal in said ladle.

12. Apparatus as defined in claim 11 including a pair of auxiliary supporting stools mounted on said spreader beam in positions under said cross-beams and between their said depending hanger elements, said stools having upper ends normally out of engagement with said cross-beams when supported on said spreader beam by said compression cells and being adapted to engage and support said cross-beams upon failure and removal of said compression cells.

References Cited in the file of this patent

UNITED STATES PATENTS

| | | |
|---|---|---|
| 1,111,560 | Brown | Sept. 22, 1914 |
| 2,142,579 | Wehr | Jan. 3, 1939 |
| 2,673,082 | Thurston | Mar. 23, 1954 |
| 2,992,691 | Schneider | July 18, 1961 |